Nov. 21, 1944.   H. C. HARBERS ET AL   2,363,178
MOTOR VEHICLE
Filed June 15, 1942     4 Sheets-Sheet 1
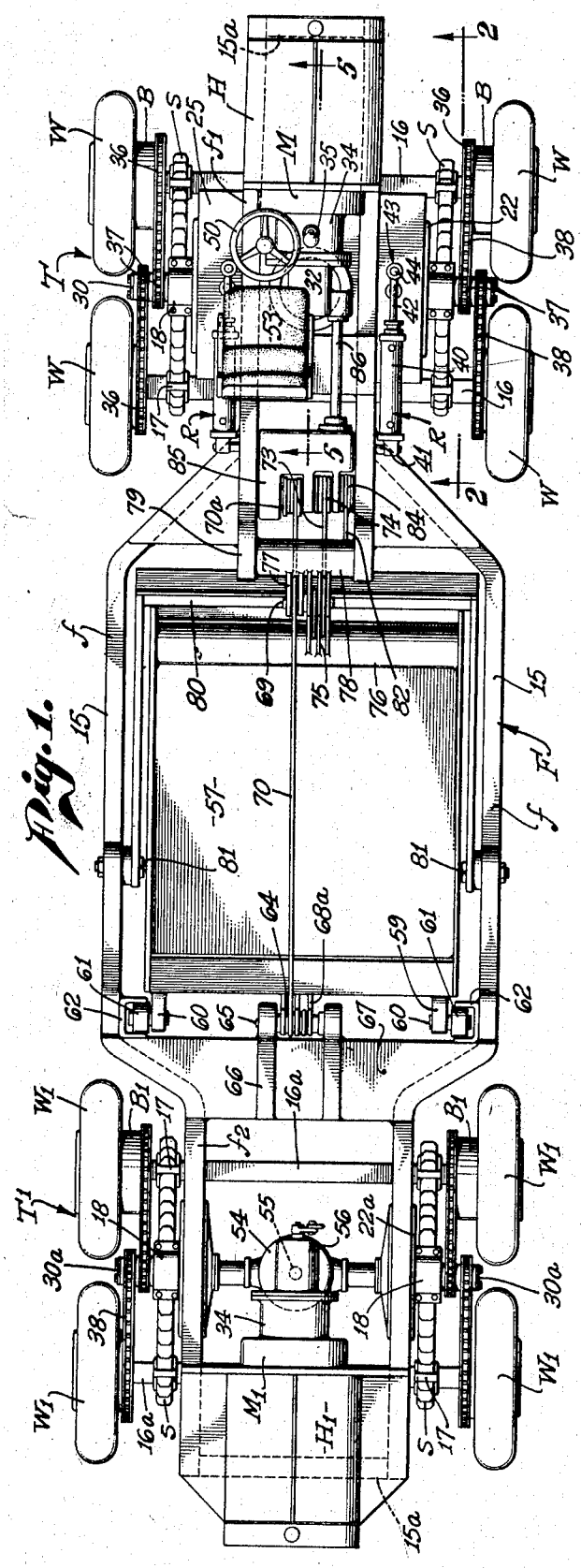
HOWARD F. COOK,
HENRY C. HARBERS,
INVENTOR.
BY Edwin D. Jones
ATTORNEY.

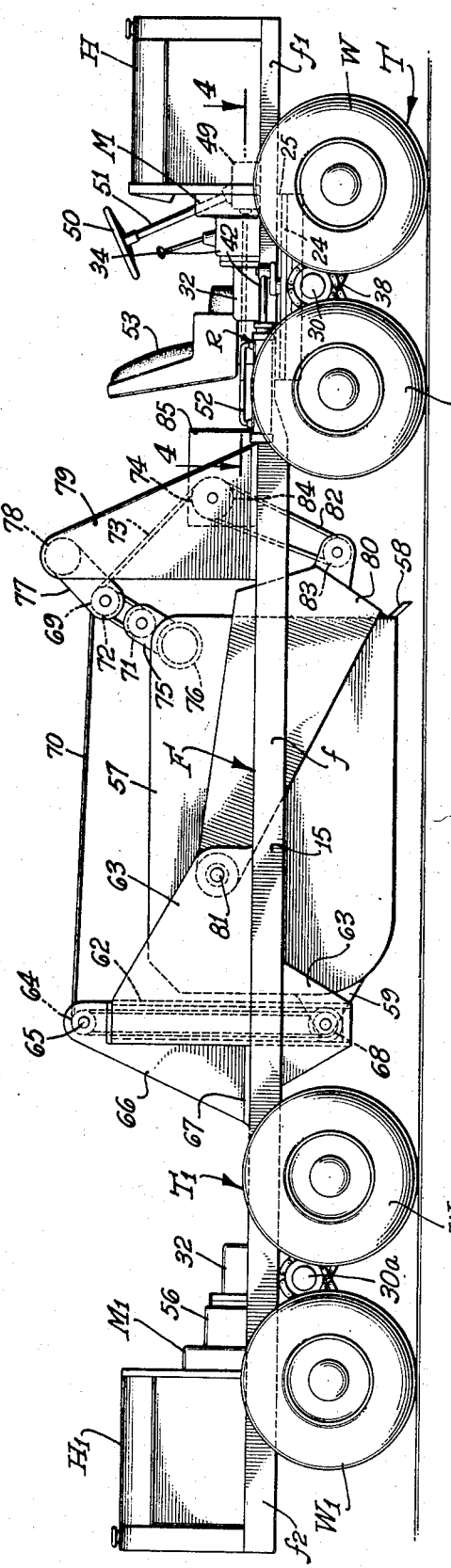

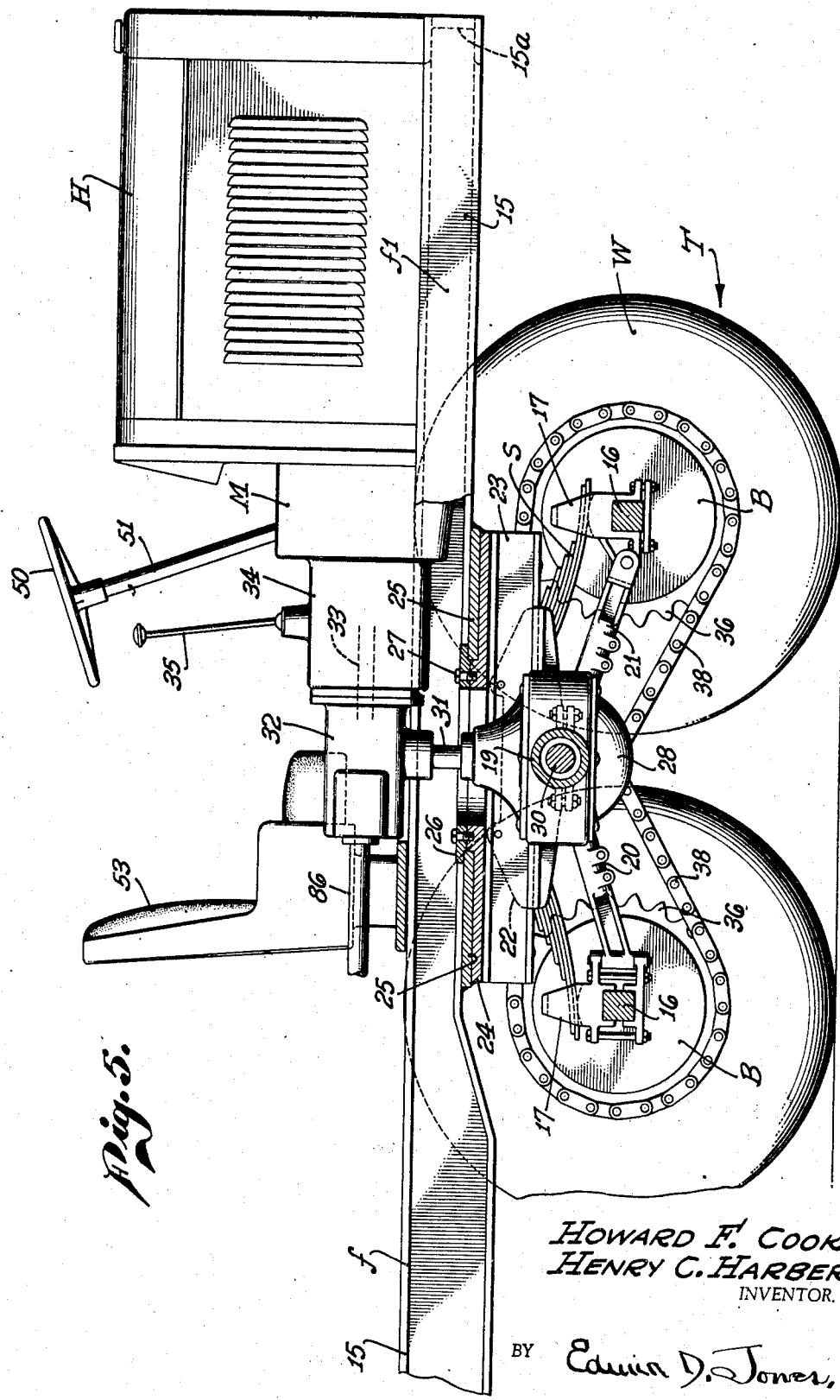

Nov. 21, 1944.  H. C. HARBERS ET AL  2,363,178
MOTOR VEHICLE
Filed June 15, 1942  4 Sheets-Sheet 4
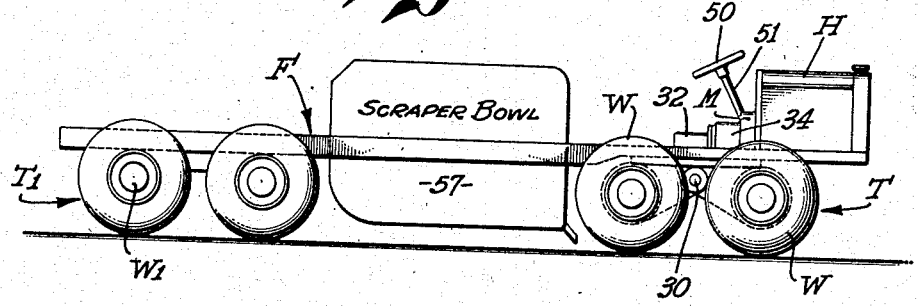
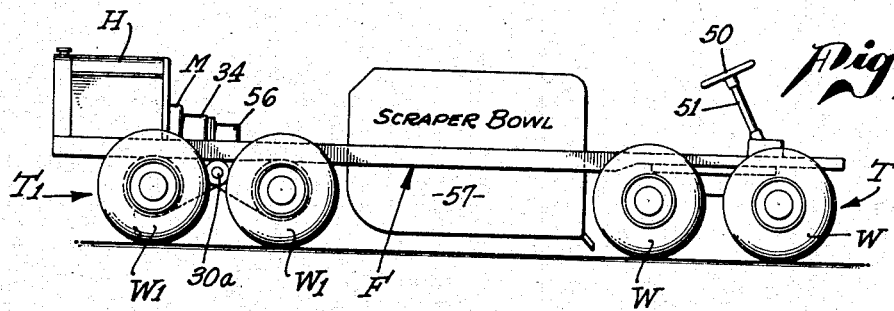
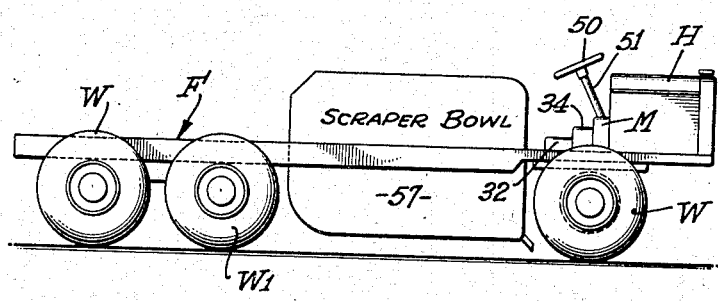
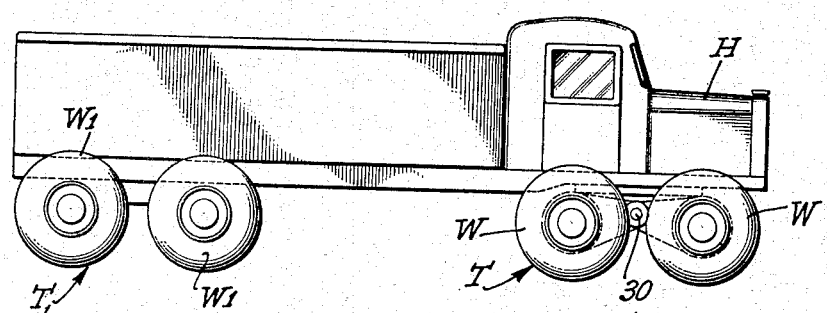
HOWARD F. COOK,
HENRY C. HARBERS,
INVENTOR.
BY Edwin D. Jones.
ATTORNEY.

Patented Nov. 21, 1944

2,363,178

UNITED STATES PATENT OFFICE 2,363,178

MOTOR VEHICLE

Henry C. Harbers and Howard F. Cook, Los Angeles, Calif., assignors to Cook Bros., Los Angeles, Calif., a copartnership Application June 15, 1942, Serial No. 447,034

3 Claims. (Cl. 180—22)

Our invention relates to earth moving vehicles such as carrying scrapers, and it has for a purpose the provision of an earth moving vehicle which is characterized by having incorporated therein one or more motors by which it is adapted to be driven under its own power and to the exclusion of a tractor or other additional motor vehicle for drawing it, as is the present practice.

It is also a purpose of our invention to provide an earth moving vehicle which embodies two truck units at opposite ends of the vehicle frame, having traction wheels arranged in groups of two or four, in various combinations and where the wheels of either or both groups are adapted to be actuated by driving mechanisms operably connected to the motor or motors.

It is also a purpose of our invention to provide an earth moving vehicle of the character above described, wherein the wheels of each truck unit are so movable in relation to the vehicle frame as to provide free and independent actions to compensate for road irregularities, in order that the vehicle frame may be maintained substantially horizontal at all times and accordingly maintain the bowl of the carrying scraper substantially horizontal to effect scraping of the earth horizontally.

Another purpose of our invention is the provision of an earth moving vehicle embodying a carrying scraper with any of the traction wheel arrangements above described, but more particularly that arrangement in which each truck unit is provided with four traction wheels, and where all wheels of both units are provided with driving mechanisms operatively connected to the two motors of the vehicle.

Another purpose of our invention is the provision in an earth moving vehicle of a steerable front truck unit having a simplified and manually controlled hydraulic mechanism for actuating the truck unit to effect steering of the vehicle.

We will describe only one form of earth moving vehicle, and various wheel arrangements of the truck units, all embodying our invention, and will then point out the novel features thereof in claims.

In the accompanying drawings:

Fig. 1 is a view showing in top plan, one form of earth moving vehicle embodying our invention having incorporated therein a carrying scraper.

Fig. 2 is an enlarged vertical sectional view taken on the line 2—2 of Fig. 1.

Fig. 3 is a view showing the vehicle of Fig. 1 in side elevation.

Fig. 4 is an enlarged horizontal sectional view taken on the line 4—4 of Fig. 3.

Fig. 5 is an enlarged vertical sectional view taken on the line 5—5 of Fig. 1.

Fig. 6 is a schematic view showing in side elevation a modified traction wheel and driving arrangement of the earth moving vehicle shown in Fig. 3.

Fig. 7 is a view similar to Fig. 6 showing another traction wheel and driving arrangement.

Fig. 8 is a view similar to Fig. 7 showing a third arrangement of traction wheel and driving mechanism.

Fig. 9 is a view similar to Fig. 8 and showing still another traction wheel and driving mechanism and as applied to a truck.

Similar reference characters refer to similar parts in each of the several views.

Referring first to Figs. 1–5, we have here shown an earth moving motor vehicle embodying a conventional form of carrying scraper, and although our invention is not limited to a carrying scraper, it has been found that the motor vehicle embodying our invention is better suited to such an adaptation because of the many advantages resultant thereof. As best shown in Figs. 1 and 2, the vehicle comprises a main frame F having side members 15, 15 and end cross members 15a, 15a. The side members 15 are shaped lengthwise to provide a wide intermediate frame portion $f$ and narrow end portions $f^1$ and $f^2$.

The main frame is supported by a front truck unit T and a rear truck unit T¹, the former, in the present instance, comprising two axles 16 transversely of the frame and traction wheels W journaled on the opposite ends of each axle. Each wheel W is provided with a brake B of any conventional form and preferably operated hydraulically.

The axles 16 are mounted on the ends of a pair of leaf springs S through stirrups 17 secured to the axles. The springs, in turn, are secured in saddles 18 pivotally mounted on a pair of housings 19, so that the springs are mounted for rocking movements to allow the axles to move vertically in relation to the main frame. Radius rods 21 are connected to the axles and to the saddles for restricting movement of the axles to vertical arcs. Two torque rods 20 are also provided and connected to the housings and axles as shown in Fig. 2.

The housings 19 are supported in brackets 22 riveted to parallel beams 23, the latter in turn being secured to the lower side of the plate 24. The plate 24 is rotatable in respect to an upper plate 25 secured to the under side of the frame members 15. This plate 25 is connected to the plate 24 through the medium of a flat collar 26 secured to the plate 24 by machine bolts 27. Both plates 24 and 25 are provided with central openings surrounded by the collar 26, and the collar overlies the plate 25 so that the plate 24 is permanently connected to the plate 25 in such manner that they are rotatable relatively.

Manifestly, the structure just described constitutes a fifth-wheel connection between the frame F and the truck unit T, whereby the latter may be rotated relative to the frame to the end of rendering the front truck steerable.

At their confronting ends the housings 19 are connected to a housing 29 for a differential mechanism employed to differentially connect a pair of jack shafts 30 to a vertical drive shaft 31, the latter rising through the openings of the plates 24 and 25 and projecting into a gear box 32. Within the gear box 32 the shaft 31 is adapted for connection through suitable gears to a horizontal shaft 33, the latter in turn being driven through a suitable variable speed transmission mechanism contained in the housing 34 and operable selectively by a lever 35. As will be understood, the transmission mechanism is suitably connected to a clutch (not shown), with the clutch driven by a motor M contained in a hood H supported on the forward end of the vehicle frame.

From the jack shafts 30 all four wheels W are adapted to be driven through chain and sprocket mechanisms, there being one mechanism for each of the wheels. Each mechanism includes a sprocket 36 fixed to the wheel and driven from one of two sprockets 37 through one of two chains 38. The sprockets 37 are fixed to the outer ends of the jack shafts 30, where they project from the ends of the housings 19. Thus through actuation of the shaft 31, the two jack shafts may be differentially driven, to in turn drive all four wheels through the chain and sprocket mechanisms.

Through provision of the fifth-wheel connection between the front truck unit T and the vehicle frame F, and the driving mechanisms for the several wheels, it will be understood that the truck unit is turnable in relation to the vehicle frame to effect steering of the vehicle, and yet at the same time all four wheels of the truck unit are positively driven irrespective of the vertical positions of the wheels W.

Steering movements of the truck unit T are effected through a hydraulically operated mechanism which, in the present instance, comprises a pair of hydraulic rams R, associated with the frame F and the plate 24 of the fifth-wheel connection, so that by manual control thereof, the truck unit can be turned in one direction or the other.

Each ram comprises a cylinder 40 pivoted at its rear end on a pin 41. A piston rod 42 projects from the forward end of the cylinder, where it is operatively connected to the plate 24 by a crank 43. As shown in Fig. 2, this crank includes a pin 44 rotatable in a sleeve 45 on the end of the rod 42, rising from a horizontal portion 46 from which latter descends a pin 47. This pin 47 is rotatable in a sleeve 48 secured within the plate 24. From this construction it will be seen that movement of the rod 42 longitudinally in either direction will effect rotation of the plate 24, the crank compensating for the arcuate movement of the plate in relation to the rod.

Pressure fluid from a suitable source (not shown) may be supplied to and discharged from the two cylinders 40, for actuating the piston rods 42 by manual operation of suitable valves in a housing 49 through a hand wheel 50 on a post 51, the housing being in fluid communication with the cylinders through pipes 52. The wheel 50 is positioned within convenient reach of a driver occupying the seat 53.

Referring again to Fig. 1, the rear truck unit $R^1$ likewise comprises two axles $16^a$ having traction wheels $W^1$ journaled on opposite ends thereof. As with the wheels W of the front truck unit, each wheel $W^1$ may be provided with a brake $B^1$ hydraulically operated.

The remainder of the rear truck unit $T^1$ is of the same construction as the front truck unit T, except that the brackets $22^a$ are secured to the side frame members 15 so that the truck unit is immovable in relation to the vehicle frame, but as with the front truck unit, the wheels $W^1$ while maintaining driving connections with the jack shafts $30^a$, are movable through vertical arcs to compensate for road irregularities. Thus, in conjunction with the wheels of the front truck, the wheels of the rear truck function to maintain the vehicle frame F against tilting and substantially in a horizontal plane irrespective of ordinary terrain irregularities.

The jack shafts $30^a$ are adapted to be driven through a differential mechanism contained in a housing 54 such mechanism including a vertical shaft 55 (Fig. 1) which extends into a box 56 containing a conventional selective transmission mechanism. The latter mechanism is operatively connected to a motor $M^1$ extending beneath a hood $H^1$, and such mechanism as well as a motor throttle may be manually operated to secure any desired driving speed of the jack shafts through the provision of suitable rods and levers (not shown) which may be arranged along the main frame to be operable by the driver occupying the seat 53. Also suitable levers and rods may be provided for actuating from the driver's seat a clutch by which the transmission is connected to and from the motor.

As previously stated herein our invention is particularly adaptable to carrying scrapers for in this adaptation large and extremely heavy quantities of earth are dealt with, and in substitution for a tractor or truck for drawing the scraper, particularly when loaded with earth, sufficient power and traction must be and is provided by the vehicle of my invention.

The carrying scraper here shown comprises a bowl 57 having an open front provided at its bottom with a scraping blade 58. The bowl is situated within the intermediate portion f of the vehicle frame (Fig. 1), and is vertically movable therein by the provision of a pair of ears 59 at the back which carry stub axles 60 on which rollers 61 are mounted. These rollers are movable lengthwise in channel beams 62 extending above and below the frame members 15, and secured to the members and to standards 63.

For raising and lowering the bowl 57 within the vehicle frame, a cable mechanism may be provided comprising an upper pair of sheaves 64 on a pin 65 in the upper ends a pair of standards 66 rising from a cross frame member 67, and a lower pair of sheaves 68 mounted on ears 68ª secured to the back of the bowl. Trained about these sheaves 64 and 68 is a cable 70 which extends from the upper sheaves forwardly above the bowl 57, around a sheave 69, and then downwardly around a winch 70ª.

For tilting the bowl 57 forwardly about the axles 60 as a center, to effect dumping thereof, a pair of sheaves 71 and 72, a cable 73 and a winch 74, are provided. The sheave 71 is mounted on ears 75 fixed to a member 76 secured to and extending across the bowl. The sheave 72 is mounted in ears 77 fixed to a member 78 secured to and bridging a pair of standards 79 rising and extending rearwardly from those members 15 of which the front end frame portion is formed. The ears 77 also provide a mounting for the sheave 69.

For confining earth within the bowl 57 during the carrying operation, an apron 80 is provided. This apron is pivoted to the standards 63, as at 81, to occupy open and closed positions at the front of the bowl. The apron may be moved to either of these positions by a cable 82, one or more sheaves 83 mounted on the apron, and a winch 84.

The winches 70ª, 74, and 84 are mounted within a box 85 secured on the vehicle frame between the standards 79. These winches are adapted to be selectively driven to elevate the bowl, tilt the bowl, and elevate the apron in the proper sequence, through the provision of suitable manually controlled mechanism not shown as it forms no part of the present invention. Preferably the winches are driven by a single shaft 86 adapted to be operatively connected to the motor M in any suitable manner.

With the bowl and apron mounted in the vehicle frame as described, the frame supported by the two truck units one of which is steerable, and the traction wheels mounted for free and independent actions, and all positively driven, and the driving means carried wholly by the vehicle, it becomes manifest that the following advantages are provided:

1. The power for driving the vehicle, as well as for operating the bowl and apron, is directly on the vehicle, thereby eliminating the use of hauling vehicles such as tractors.

2. The driving power provided by the two motors and the eight driving wheels, is adequate for the vehicle to transport extremely heavy loads of earth or rocks, thus permitting the use of a bowl far in excess of the carrying capacity of previous bowls. Moreover, the power provided by the rear truck unit serves to drive the bowl rather than draw it, which facilitates the scraping of particularly hard earth, as well as rock formations. This advantage may be furthered by operating the front motor M in conjunction with the rear motor, thereby combining the power of the two motors to not only push but also pull the bowl.

3. By virute of the movability of the truck units in relation to the vehicle frame, the units are free to oscillate about the jack shafts as a center so that irrespective of the uneven character of the terrain, the vehicle frame will be maintained substantially horizontal, or parallel to the general plane of the ground, to hold the bowl blade 58 in a corresponding position, and thus produce a level scraping action.

4. The fifth-wheel connection between the front truck unit and the vehicle frame, and the hydraulic means for turning the truck unit, combine to afford steering means for the vehicle as a whole, easily operable by the driver, who can also control the winches to operate the bowl and apron.

In Figure 6, we have shown the motor vehicle of my invention as applied to a carrying scraper with front truck unit steerable and all four wheels W provided with driving mechanisms driven from the motor M, but while the wheels $W^1$ of the rear truck unit are mounted for free and independent actions, they are without driving mechanisms. The same arrangement and mounting of the truck units occurs in the form of my invention shown in Fig. 9, where the vehicle frame carried a truck body which may be movable in relation to the frame for dumping.

In Fig. 7 is shown a further modification of our invention wherein the front truck unit T while connected to the vehicle frame through a fifth-wheel for steering, the wheels W thereof are without driving mechanisms yet oscillatable for free and independent actions. Also, the wheels $W^1$ of the rear truck unit $T^1$ are provided with driving mechanisms operable from the rear motor $M^1$.

In Fig. 8, is shown another modified wheel arrangement wherein the front truck T unit comprises only two wheels turnable in relation to the vehicle frame for steering and each driven from the motor M through jack shafts, a differential, and a vertical shaft, similar in arrangement to the jack shafts 30, the differential, and the vertical shaft shown in Fig. 5. As in the form shown in Fig. 6, the wheels $W^1$ of the rear truck units are without driving mechanisms but are mounted for free and independent actions.

While we have shown and described the motor vehicle as particularly adapted for use as a carrying scraper, or a dump truck, it is to be understood that our invention is not limited to these adaptations, but may be used as a fire truck, water truck or in any other capacity to which it may be suited.

We claim:

1. In a motor vehicle; a main frame; four traction wheels supporting the rear end of said frame; a prime mover mounted on said frame and projecting beyond said traction wheels; a pair of transversely disposed driven shafts operatively connected with said traction wheels; a differential mechanism interposed between said driven shafts; means connecting the tail shaft of said prime mover with said differential; a four wheel traction unit supporting the front end of said frame; a fifth wheel connecting said unit to the frame and providing a steering arrangement for the vehicle; a second prime mover mounted on said frame and projecting beyond said traction wheels; a pair of transversely disposed driven shafts operatively connected with the last mentioned traction wheels; a second differential mechanism interposed between said driven shafts; and means connecting said driven shafts with the tail shaft of said second prime mover.

2. In a motor vehicle; a main frame; a four wheel traction unit supporting the rear end of said frame; a prime mover mounted on said frame and projecting beyond said traction wheels and having the tail shaft thereof inwardly of said frame; transversely disposed driven shafts arranged between the pairs of wheels of said unit and operatively connected to said wheels; a differential mechanism interposed between said driven shafts; a vertically disposed shaft projecting from said differential mechanism and operatively connected with the tail shaft of said prime mover; a four wheel traction unit supporting the front end of said frame; a second prime mover mounted on said frame and projecting beyond the traction wheels of the front unit and having the tail shaft thereof inwardly of said frame; transversely disposed driven shafts arranged between the pairs of wheels of said front unit and operatively connected to said wheels; a second differential mechanism interposed between said driven shafts; and a vertically disposed shaft projecting from the last mentioned differential mechanism; said vertically disposed shaft being operatively connected with the tail shaft of said second prime mover.

3. In a motor vehicle; a main frame; a four wheel traction unit supporting the rear end of said frame; a prime mover mounted on said frame and projecting beyond said traction wheels and having the tail shaft thereof inwardly of said frame; transversely disposed driven shafts arranged between the pairs of wheels of said unit and operatively connected to said wheels; a differential mechanism interposed between said driven shafts; a vertically disposed shaft projecting from said differential mechanism and operatively connected with the tail shaft of said prime mover; a four wheel traction unit supporting the front end of said frame and rotatably connected to said frame through a fifth wheel to provide a steering arrangement for the vehicle; a second prime mover mounted on said frame and projecting beyond the traction wheels of the front unit and having the tail shaft thereof inwardly of said frame; transversely disposed driven shafts arranged between the pairs of wheels of said front unit and operatively connected to said wheels; a second differential mechanism interposed between said driven shafts; a vertically disposed shaft projecting from the last mentioned differential mechanism; said vertically disposed shaft having its axis coincident with the axis of rotation of the front four wheel unit; and means operatively connecting said shaft with the tail shaft of said second prime mover.

HOWARD F. COOK.
HENRY C. HARBERS.